Figure 1:
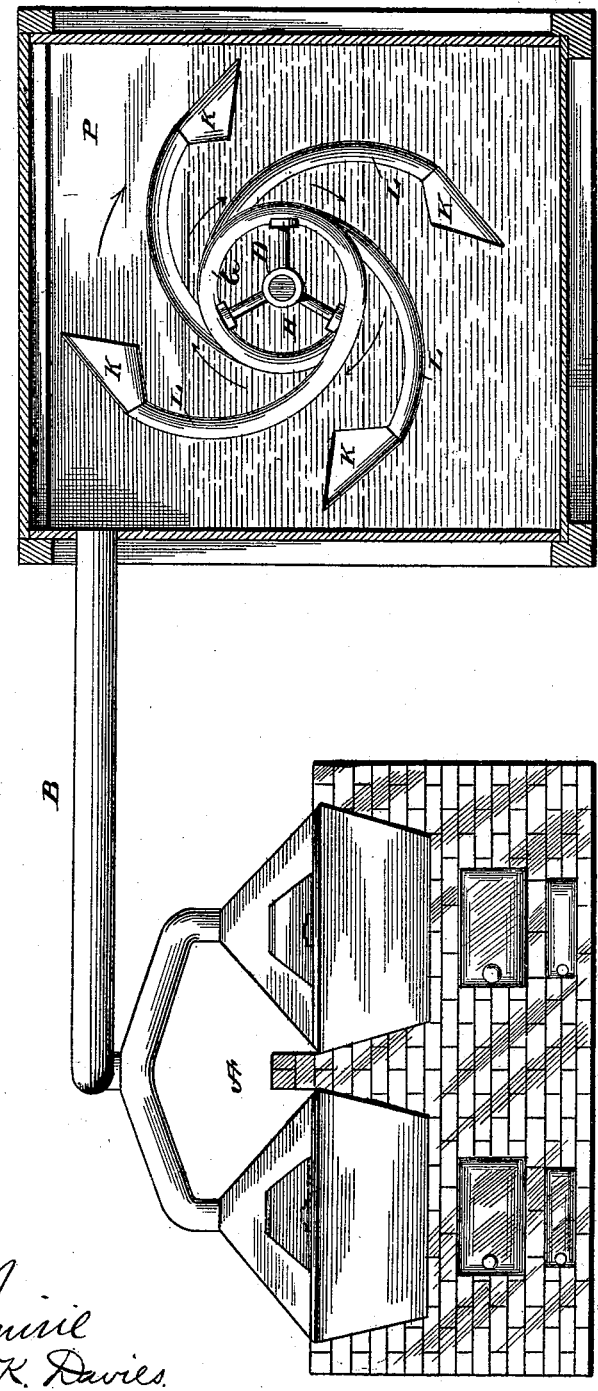

(No Model.) 2 Sheets—Sheet 1.

S. G. MERRICK.
CONDENSATION OF VAPORS.

No. 552,133. Patented Dec. 31, 1895.

Witnesses
John Smirl
Chas. K. Davies.

Inventor
S. G. Merrick
By
W. H. Bartlett
Attorney (No Model.) 2 Sheets—Sheet 2.
S. G. MERRICK.
CONDENSATION OF VAPORS.
No. 552,133. Patented Dec. 31, 1895.
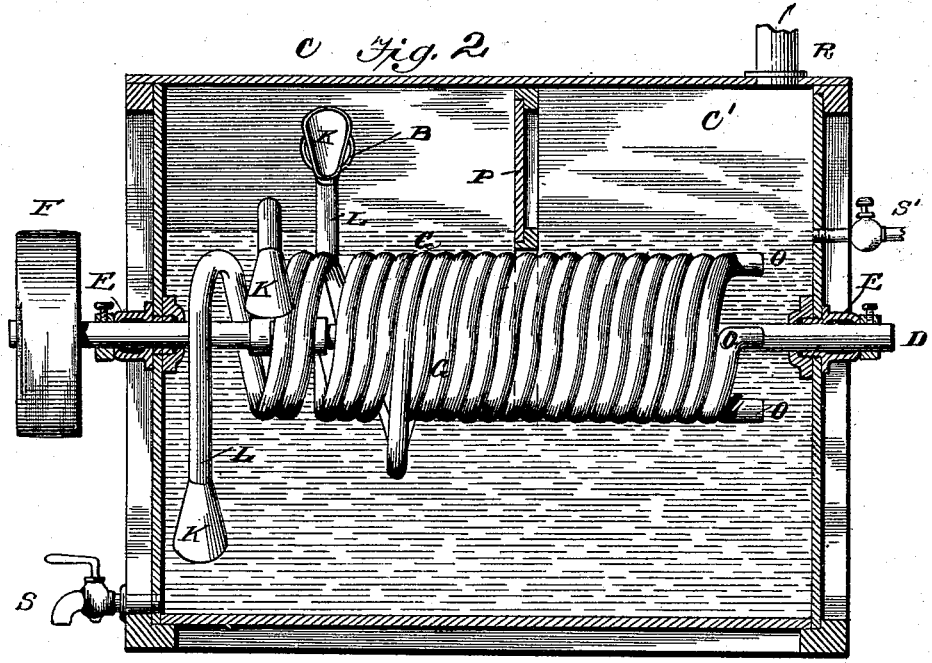
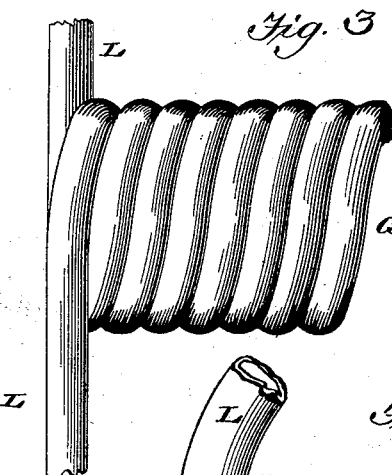
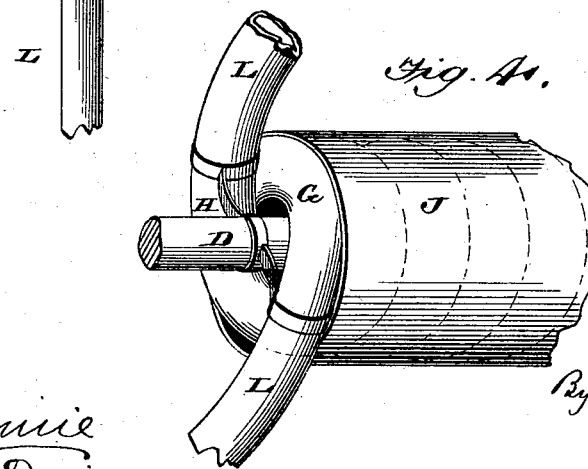

UNITED STATES PATENT OFFICE.

SAMUEL G. MERRICK, OF PHILADELPHIA, PENNSYLVANIA, ASSIGNOR TO THE UNITED SMOKE AND VAPOR CONDENSING COMPANY, OF CAMDEN, NEW JERSEY.

CONDENSATION OF VAPORS.

SPECIFICATION forming part of Letters Patent No. 552,133, dated December 31, 1895.

Application filed May 2, 1895. Serial No. 547,841. (No model.)

*To all whom it may concern:*

Be it known that I, SAMUEL G. MERRICK, residing at Philadelphia, in the county of Philadelphia and State of Pennsylvania, have invented certain new and useful Improvements in Condensation of Vapors, of which the following is a specification, reference being had therein to the accompanying drawings.

This invention relates to condensing fumes or vapors, purifying air or gases, deodorizing or destroying noxious vapors, securing by-products of combustion or distillation, and like purposes.

The object of the invention is to improve the means and mechanism for the condensing of vapors, &c., by exposing them to mechanical or mechanical and chemical action, substantially as hereinafter described.

In the patent to Kirk and Ayers, No. 152,173, of July 21, 1874, a device is shown for condensing fumes wherein an endless or Archimedean screw is formed by dividing a cylinder spirally, and immersing a part of the cylinder in water. By rotating this cylinder vapors or fumes may be taken in at one end, and passed along the spiral, more or less in contact with the water, and thrown out at the other end. Some measure of success has attended the use of this machine, but it is on the whole unsatisfactory, among other reasons, as I believe, because the gases are not subjected to pressure under water, or to violent agitation. By my improved construction and combination I overcome many objections found to exist in such machine. The English Patent No. 289, of 1869, for scrubbing gas, shows a device wherein a rotating shaft or hub with cycloidal arms takes in gas at the periphery and carries it under water, where the gas escapes through the hub. I am not aware that this device has ever been practically successful, for the reason, as I believe, that when rotated at anything above a very slow speed the centrifugal force carries the water toward the periphery of the wheel and largely excludes the gases. My apparatus does not act in the same manner. These two devices and some minor modifications thereof fairly represent the state of the art, so far as I am informed and believe. The practical operation of the Kirk and Ayers device seems to be that the screw conveyer slices, as it were, a portion of the air or gas from its column and then a portion of water from its column and passes them along the screw conveyer, each in the plane of their respective columns. The present device scoops up the gaseous matter, compresses it, and carries it below the plane of the liquid, where it is subject to both pressure and agitation. The liquid, entirely covering the coiled body of the tube, abstracts heat therefrom, and if a proper chemical be used chemical reaction takes place in the coil.

Figure 1 indicates an end elevation of a retort or furnace for the roasting of ores, distillation of oil, or any similar purpose, and connected therewith is shown in cross-section the condensing apparatus according to one form of my invention. The proportions of parts are distorted to show more fully the mechanism of the condenser. Fig. 2 is a longitudinal section of the condenser. Fig. 3 is a broken detail of the tube of my condenser according to one form. Fig. 4 is a broken detail of a modification of the condenser-coil inclosed in a casing.

It will be understood, I think, from the description that my apparatus is capable of many modifications and of various uses without departing from the spirit of my invention.

A indicates a furnace or retort, which is merely a type, and intended to represent any mechanism for distillation, or for producing or gathering gases, fumes, or the like.

B indicates a pipe or passage by which the gases, &c., are conducted to the condensing or purifying apparatus.

C indicates a box or chamber of any suitable construction and preferably water-tight. The cover is preferably gas-tight, although in dealing with fumes of some kinds a slight escape of gas is not very important.

Inside the box C, I place a shaft D, supported in bearings, and the ends passing through stuffing-boxes E in the walls of the box. A driving-pulley F is attached to the shaft outside the box, and the shaft is driven thereby. Of course other driving-gear might be used. Around the shaft D, I arrange a suitable number of spiral coils G, supported on spiders H or otherwise, so as to permit free passage of water or other liquid to the outside of the coils. The chamber C is filled with the liquid above the level of the spiral bodies of the coils, and the coils are firmly connected with shaft D, to partake of its rotation. Each coil has a mouthpiece or funnel K, connected to the spiral tube by a curved tube-section L. The tube-section L extends outside the curve-line of the spiral so far as to carry the funnels K above the surface of the water in the chamber in the rotation of the shaft D, and the funnels preferably have their large open ends inclined in about the plane necessary to close the mouth at once as the mouth reaches the water-level. The direction of rotation is indicated by the arrow, Fig. 1. As the open-mouthed funnel moves in this direction, it takes or scoops up a considerable quantity of the gaseous contents of chamber C. When the funnel is closed by the entering of water or liquid, the gas, or mixed air and gas, or smoke, is put under pressure by the water or liquid which enters the funnel during its passage through that part of the circle which is below the water-line. The gas is carried below the water-line, and following tubes L to the spiral coil G the gas rises to the top of the coil, and passes along said coil toward the exit O in chamber C'. The gas scooped into the coil during the passage above the water-surface is immediately followed by the water or liquid scooped in below the water-line, and both gas and liquid follow the coils to the exits O, the gas constantly tending to the upper part of the spiral coils, but being below the water-level and exposed to the cooling action of the liquid on the pipe of the coil and also to the compression of the body of liquid which follows and precedes it. The gas will, during such passage, yield up much of its foreign matter, and if not a fixed gas will generally be absorbed by the water or liquid. In treating the fumes from distillation of petroleum in this manner, the entire deleterious products of distillation have been absorbed by the water, leaving the air escaping from passages O quite pure. The absorbed fumes in the water have then been recovered by chemical reactions or by distillation, or by both, and the by-products so recovered in instances have more than paid the cost of condensation, besides destroying the noxious fumes.

The chamber C' is separated from chamber C by a partition P, which extends below the water-line, and preferably extends as low as the bottom of coils G. Below this partition the water or other liquid has free communication between chambers C and C', and the water carried through the coiled pipes will flow back by force of gravity to find its proper level, and a constant circulation and equalization of temperature will thus be maintained.

The air or gas may escape or be forced from pipe or passage R, or otherwised isposed of, according to the circumstances of the case.

Water change or circulation may be had by means of pipes or cocks S S' or by other suitable connections.

In treating acid fumes an alkaline solution may be used instead of water in chambers C C', or vice versa, thus causing reaction as well as condensation within the coils, and in general the liquid used will be according to the circumstances of the case. The arrangement of two pipes in spiral coil is shown in Fig. 3, and a somewhat similar arrangement of coils covered by a jacket J is shown in Fig. 4. It will be understood that the number of coils, the size of tubes, and the dimension, proportion, and construction of funnels will largely depend on the particular use to which the machine is applied. Besides the condensation of gases from chemical and oleaginous distillation, to which this apparatus has been successfully applied, I believe it may be used in condensing or destroying smoke from furnaces, purifying the air in mines, collecting dust in mills, and for other purposes. Preferably the pipe B enters chamber C behind the funnels, as shown. The tendency is thus to produce a powerful suction in said pipe or passage, so that the machine will rapidly take in the air or gases which are permitted to enter said chamber and condense or purify the same.

The horizontal arrangement of coils G has been found most satisfactory in machines so far used, but possibly the shaft D and its coils might be inclined.

What I claim is—

1. In a condensing apparatus as described, the receiving and delivery chambers separated by a partition, the spiral coil arranged to rotate as described with one end in the receiving and the other end in the delivery chamber, and having its coiled body entirely below the water line, and the funnel connected to the coil in the receiving chamber, and passing above the water line therein in the course of its revolution, all combined substantially as described whereby the gases in the coiled body are under hydrostatic pressure, and the heat is abstracted by the water in contact with the coils.

2. In a condensing apparatus, the rotating shaft having spiral coils connected thereto, the body of the coil being entirely immersed in liquid, each coil having a curved tube section extending outside the circumference of the coil, and having an open mouthed funnel connected thereto, combined with the liquid-containing receiving and delivery chambers into which opposite ends of the coil extend, all substantially as described.

3. In a condensing apparatus, the rotating shaft, the spiral coils connected to said shaft having their ends respectively in receiving and delivery chambers, the funnels connected to the coils by tubes extending outside the spiral, the liquid in the chambers extending above the spiral body of the coils, and the funnels on the connecting tubes having their mouths inclined to enter the water horizontally, all the specified elements in combination substantially as described.

4. The condensing apparatus described consisting essentially of the receiving and delivery chambers partially divided by a partition, the liquid contained therein, the rotating coils having their spiral bodies below the surface of the liquid but having connecting tubes projecting above the surface of the liquid and carrying funnels, and the inlet pipe entering the receiving chamber in rear of the open funnel mouths, all substantially as described.

5. In a condensing apparatus, the receiving and delivery chambers separated at the upper part by a partition, the chemical aqueous solution reagent to the gases under treatment and extending up to the partition, and the rotating coil, passing under the partition, having one end in each chamber, and having a funnel mouth piece in the receiving chamber which in the rotation of the coil extends above the surface of the liquid during part of its rotation, all combined substantially as described.

In testimony whereof I affix my signature in presence of two witnesses.

SAMUEL G. MERRICK.

Witnesses:
WM. B. BUCK,
HENRY L. WASHBURN.